United States Patent [19]

Okushima et al.

[11] Patent Number: 4,773,183
[45] Date of Patent: Sep. 27, 1988

[54] CONTACT SENSITIVE CONTROL APPARATUS

[75] Inventors: Akihiro Okushima, Nagoya; Yukio Hirota, Iwata; Keisuke Ishigashi, Nagoya, all of Japan

[73] Assignee: Omron Tateisi Electronics Co., Kyoto, Japan

[21] Appl. No.: 18,466

[22] Filed: Feb. 25, 1987

[30] Foreign Application Priority Data

Feb. 28, 1986 [JP] Japan .................. 61-44505
Feb. 28, 1986 [JP] Japan .................. 61-44506
Feb. 28, 1986 [JP] Japan .................. 61-44507

[51] Int. Cl.⁴ .............................................. E05F 15/02
[52] U.S. Cl. ............................................................ 49/28
[58] Field of Search ............................ 49/26, 27, 28

[56] References Cited

U.S. PATENT DOCUMENTS 4,561,691 12/1985 Kawai et al. ................ 49/28 X
4,621,223 11/1986 Murakami et al. ........... 49/28 X

FOREIGN PATENT DOCUMENTS 2610559 12/1976 Fed. Rep. of Germany ......... 49/27
2637309  3/1977 Fed. Rep. of Germany ......... 49/26

Primary Examiner—Philip C. Kannan
Attorney, Agent, or Firm—Stevens, Davis, Miller & Mosher

[57] ABSTRACT

In an automatically opened and closed mechanism, such a power window, a sunroof or the like, which is opened and closed automatically, a contact sensitive control apparatus according to the invention includes a sealed tube stretched on a frame of an opened and closed portion. A change in the pressure within the tube produced by contact with the frame when the opened and closed portion is closed is sensed by a pressure sensor. When the change in the pressure is detected, the closing of the opened and closed portion is stopped at once. This allows the occurrence of an accident of injury to be prevented in advance which includes portion of a human body being pinned by the window or the like when the opened and closed portion is closed.

19 Claims, 20 Drawing Sheets

FIG. 4(a)   FIG. 4(b)
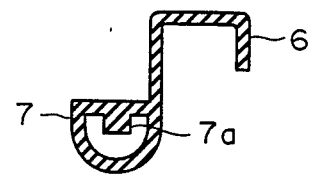 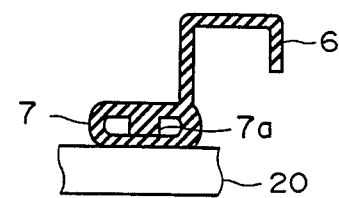
FIG. 5(a)   FIG. 5(b)
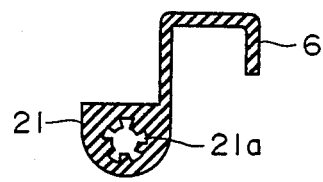 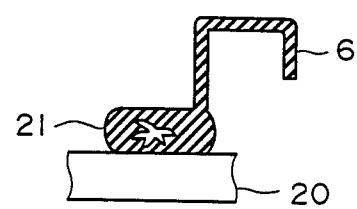
FIG. 6(a)   FIG. 6(b)
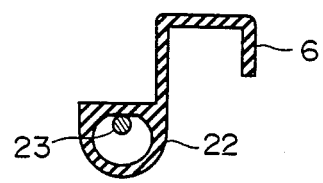 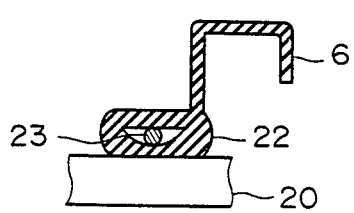

FIG. 7
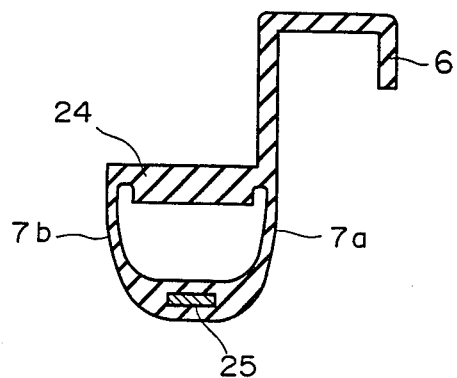
FIG. 8
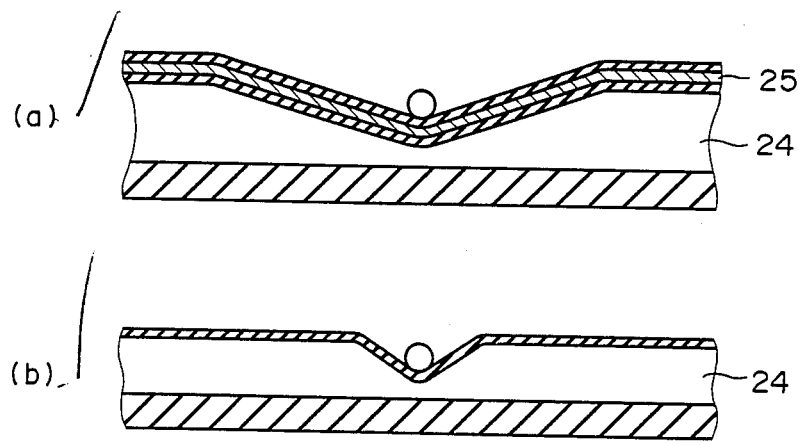
FIG.9(a)     FIG.9(b)
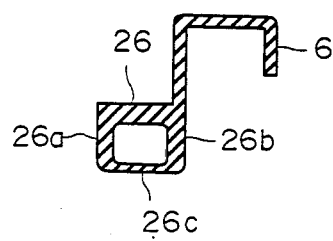 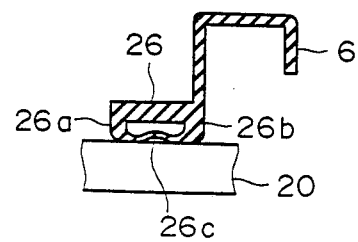

CONTACT SENSITIVE CONTROL APPARATUS

BACKGROUND OF THE INVENTION (1) Field of the Invention

The invention relates to a contact sensitive control apparatus used in a portion which is automatically opened and closed, such as a power window, a sunroof for a vehicle.

(2) Description of the Prior Art

Recently, some vehicles have a power window, a sunroof, etc., mounted thereon. These power window and sunroof are automatically opened and closed by predetermined switching operations. Opening or closing a prior art opened and closed device is controlled when the drive current to the motor increases abnormally at a time of opening or closing the device. A strong motor is used for the drive motor so as to ensure the opening and closing of the device under various conditions. Thus the abnormal level is high. A recognized problem is that part of the loaded articles and the body of a passenger within the vehicle, etc., may clog the device to be damaged and injured.

SUMMARY OF THE INVENTION

The invention has been made in view of such a problem with the prior art automatic opening and closing device for vehicles. The object of the invention is to provide a contact sensitive control apparatus which includes contact sensitive means provided on a frame of an opened and closed portion for producing a stop output which stops the closing of the opened and closed portion automatically when some contact is sensed to thereby prevent occurrence of such an injury in advance.

BRIEF DESCRIPTION OF THE DRAWINGS

FIGS. 4(a), 5(a), 6(a) and 7 are cross-sectional views showing different examples of a tube of the control apparatus according to the first embodiment, and FIGS. 4(b), 5(b) and 6(b) are cross-sectional views showing the respective states of the pressed tubes.

FIG. 8(a) ia a cross-sectional view showing the state of the tube of FIG. 7 pressed by a small object, and FIG. 8(b) is a cross-sectional view showing the state of a pressed regular tube.

FIG. 9(a) is a view showing the cross-sectional structure of another tube of the first embodiment, and FIG. 9(b) is a cross-sectional view showing the state of that pressed tube.

FIG. 28(a) is a cross-sectional view showing the state in which the push button is not pushed, and FIGS. 28(b) and (c) are cross-sectional views showing the states of the push button when pressed.

DESCRIPTION OF THE PREFERRED EMBODIMENT

The invention is a contact sensitive control apparatus mounted on an opened and closed mechanism opened and closed automatically by drive means, comprising a tube stretched on a frame contacted when the mechanism is closed, a pressure sensor in communication with the tube for sensing the pressure within the tube, pressure detection means for detecting application of a pressure to the tube on the basis of changes in the output from the pressure sensor, and control means for detecting contact with an opened and closed portion of the opened and closed mechanism on the basis of a detection signal from the pressure detection means to inhibit the closing of the opened and closed portion.

EMBODIMENT 1

Figure 1:
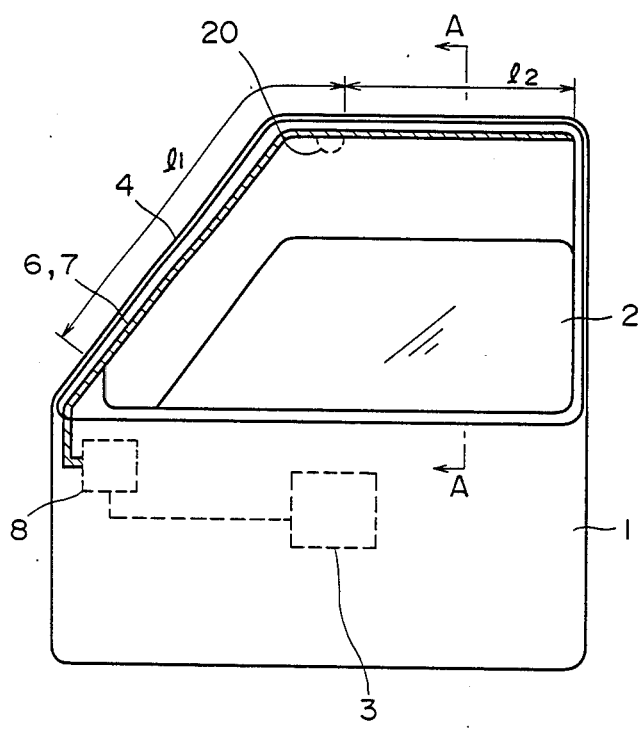
FIG. 1 is a schematic view showing the structure of a vehicle door of a first embodiment, to a window of which a contact sensitive control apparatus according to the invention is applied.
Figure 2:
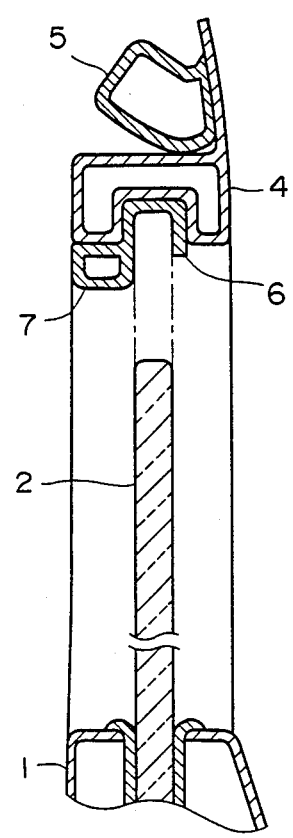
FIG. 2 is a cross-sectional view taken along the line A—A of FIG. 1.

FIG. 1 is a view showing the structure of one embodiment in which a contact sensitive control apparatus according to the invention is applied to a power window of a vehicle. FIG. 2 is an enlarged cross-sectional view taken along the line A—A of FIG. 1. In these Figures, provided within a vehicle door 1 is a window drive 3 to open and close a window glass 2. An external control input to the drive opens and closes window glass 2 automatically. As shown in FIG. 2, a frame 4 of an upper half of door 1 is formed by a U-like cross-sectional cylindrical frame 4 having a protrusion on its top. A weather strip 5 is mounted on the upper inner surface of frame 4 and serving as a seal member against the vehicle body when door 1 is closed. A weather strip 6 is provided on the lower surface of the frame 4 and contacting the window glass 2 when same is closed. In the invention, a hollow tube 7 of soft rubber is formed on the weather strip 6 provided on the side of the glass. Tube 7 may be formed integrally with weather strip 6, as shown in FIG. 2, or may be bonded to one surface of weather strip 6. As shown cross-hatched in FIG. 1, tube 7 has a sealed structure extending along the upper and front edges of frame 4 of door 1. A fluid, for example, of air, oil or the like is enclosed within the tube. In this embodiment, it is assumed that air is enclosed within tube 7. A controller 8 is provided within door 1 of the vehicle and communicates with tube 7.

Figure 3:
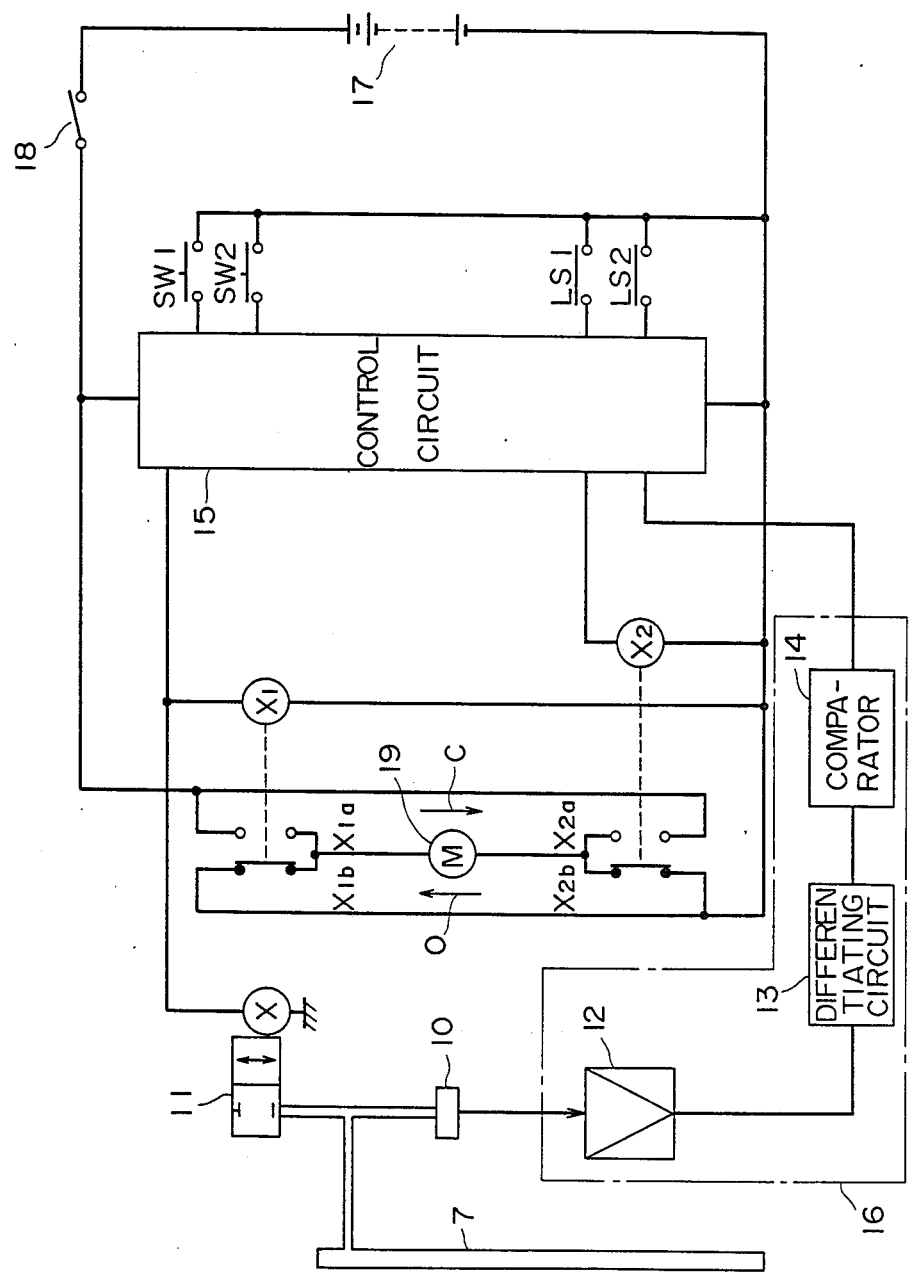
FIG. 3 is a circuit diagram showing details of the contact sensitive control apparatus of the first embodiment.

FIG. 3 is a block diagram showing the internal structure of controller 8 communicating with tube 7 and of window drive 3. In this Figure, a pressure sensor 10 and an electromagnetic valve 11 are provided, both communicating ith tube 7. Pressure sensor 10 includes a semiconductor pressure sensor which senses changes in the pressure within tube 7, and provides its output via an amplifier 12 to a differentiating circuit 13. Differentiating circuit 13 differentiates its input signal, senses a quantity of change in the input signal, and supplies its output to a comparator 14. Comparator 14 compares the amplified output with a predetermined level. If the output is higher than the predetermined level, a detection signal is supplied to a control circuit 15. Amplifier 12, differentiating circuit 13 and comparator 14 constitute a pressure detection means 16 which detects application of a pressure to tube 7. Control circuit 15 receives inputs indicative of the opening and closing of the power window from switches SW1, SW2, a contact detection signal from comparator 14, and signals, indicating that opening and closing of window glass 2 have been completed, from limit switches LS1, LS2 provided within window drive 3 when window glass 2 has completely been opened and closed. Control circuit 15 is supplied with power via an ignition switch 18 from the vehicle battery 17. Control circuit 15 energizes relay X1 by the output of the closing input switch SW2 and deenergizes relay X1 by the output of limit switch LS2 which provides a closing completion output, energizes the opening relay X2 on the basis of the output of the opening input switch SW1, and deenergizes relay X2 by the output of limit switch LS1 which provides an opening completion signal. Normally open contacts X1a, X2a of relays X1, X2 are connected at one end to the power source terminals, and at the other end to terminals of a motor 19. Normally closed contacts X1b, X2b are connected at one end to the terminals of motor 19. Normally closed contacts X1b, X2b of relays X1, X2 are grounded at the other end. On the other hand, electromagnetic valve 11 serves to open and close tube 7, and is constructed so as to interlock with relay X1. It opens tube 7 when relay X1 is deenergized and closes tube 7 only when relay X1 is energized.

Pressure sensor 10 should preferably have a temperature characteristic in which the level of the output of the sensor is minimum at room temperature and higher at a temperature other than at room temperature. Use of such sensor eliminates a need for a temperature compensation circuit, and ensures that comparator 14 operates only by setting a threshold for comparator 14 at room temperature.

The operation of this embodiment will now be described. Since electromagnetic valve 11 is normally open, tube 7 juxtaposed to weather trip 6 at frame 4 is open to the atmosphere and the internal pressure of tube 7 is equal to the atmospheric pressure. When window glass 2 of door 1 is to be closed, switch SW2 gives a closing signal to control circuit 15. Control circuit 15 drives relay X1 on the basis of the closing signal to close normally open contact X1a and electromagnetic valve 11, thereby maintaining tube 7 airtight. Thus a current flows through motor 19 in the direction of the arrow C to raise window glass 2. When closing the window is completed, limit switch LS1 gives a closing completion signal to control circuit 15. Driving relay X1 is then stopped and electromagnetic valve 11 is deenergized to open tube 7. When window glass 2 is opened, switch SW1 gives an opening signal to control circuit 15 to drive relay X2 to thereby close its normally open contact X2a, so that a current flows through motor 19 in the direction of the arrow O, thereby opening window glass 2.

While window glass 2 is being closed, an arm of a passenger, a baggage or the like may be placed between door glass 2 and frame 4. In this case, a portion of tube 7 is pressed and the pressure within the tube increases because electromagnetic valve 11 is closed. Thus this change in the air pressure is sensed by pressure sensor 11 which produces an increased output level. This signal is amplified by amplifier 12 and delivered to differentiating circuit 13 which then outputs a quantity of its change to comparator 14 at the next stage. Thus if the differentiated output exceeds a predetermined threshold level, comparator 14 produces a contact detection signal to control circuit 15. This causes control circuit 15 to stop driving relay X1 at once and then to drive relay X2. This in turn causes normally closed contact X1b of relay X1 and normally open contact X2a of relay X2 to be closed to thereby cause a current to flow through opening and closing motor 19 in the direction of the arrow O. This causes window glass 2 to be automatically switched from its closed state to its opened state. Therefore, if a hand, the neck of a passenger, etc., becomes pinned by window glass 2, this is detected due to pressure to tube 7 to stop at once the closing of the window glass so as to move the same to its open state. When the window glass 2 is to be opened, relay X2 is energized. In this case, electromagnetic valve 11 is open, so that window glass 2 can be opened with no contact detection signal being given by comparator 14.

Before window 2 is closed, tube 7 may be partially clogged with a foreign substance and pressed. FIG. 1 shows by the broken lines a foreign substance 20 gotten by tube 7. If the cross-section of tube 7 should be semicircular with this gap being not present, only an area l1 of tube 7 of FIG. 1 on the side of controller 8 would be a contact detection area while an area 12 after foreign substance 20 would be a dead zone where no contact can be detected because there is no flow of air there. However, as shown in FIG. 4(a), if a series of line-like protrusions 7a is provided within the cross-section of tube 7, as shown in FIG. 4(b), a small gap will be maintained, as shown in FIG. 4(b), even if tube 7 may be pressed. Thus provision of line-like protrusions 7a within tube 7 allows air to flow in tube 7 although a foreign substance 20 is gotten in tube 7, thereby to detect contact using the entire area of tube 7 as a contact detection area.

While in this embodiment, tube 7 is shown semicircular in cross section with protrusions 7a therein, protrusions and recesses 21a may be provided on the inner surface of tube 7 when the cross-section of tube 21 is that of a cylinder, as shown in FIG. 5(a), so as to allow air to flow therethrough even when pressed, as shown in FIG. 5(b).

As shown in FIG. 6(a), by beforehand insertion of a line-like elastic member 23 through the overall length of tube 22, a small air flow path is formed in the tube even when the tube is pressed by a foreign substance gotten in the tube, as shown in FIG. 6(b). Therefore, similarly, a dead zone of tube 22 can be eliminated.

As shown in FIG. 7, a line-like member 25 may be embedded into part of a ring-like cross-section of tube 24 and a protrusion may be provided therein to thereby ensure an air flow path even when the tube is pressed. In this case, although part of the tube is pushed by an elongated object, a change in the volume of the tube due to deformation of the tube becomes larger, as shown in FIG. 8(a), which is different from the case in FIG. 8(b). Therefore, contact can be detected with high sensitivity. This line-like member can be realized by inserting a piece of plate-like wire or a plurality of pieces of wire.

In addition, as shown in FIGS. 9(a), (b), opposing portions 26a, 26b in the cross section of tube 26 may be thick and other portions 26c may be thinner. According to this, although a foreign substance may be entered, only a soft portion 26c is deformed to thereby ensure an air flow path within the tube.

In this embodiment, pressure detection means 16 is provided with a differentiating circuit 13 to sense contact with the tube on the basis of a change in the level of the output from amplifier 12. However, the amplifier output may be compared directly to a predetermined level to detect application of a pressure by an increased level of the amplifier output.

EMBODIMENT 2

Figure 10:
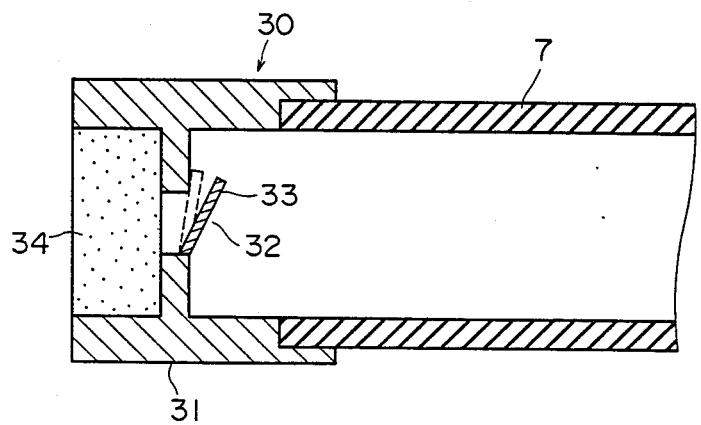
FIG. 10 is a cross-sectional view showing the structure of a valve used in a contact sensitive control apparatus according to a second embodiment of this application.

While in the first embodiment, tube 7 is opened and closed by electromagnetic valve 11, it may be provided with a valve at one end thereof so that the valve closes a normally small-open end of the tube when contact occurs. This embodiment is a contact sensitive control apparatus in which tube 7 has such a valve at one end, and is similar to the first embodiment except that it does not use electromagnetic valve 11. Thus a detailed description will be omitted. FIG. 10 shows the structure of such a valve 30. In this Figure, tube 7 has at one end a cylindrical metal pipe 31 fitted over it. Provided inside metal pipe 31 is a rubber cap 33 having a small through hole 32. Rubber cap 33 is attached inside one end of metal pipe 31 to open and closed same. Provided outside metal pipe 31 is a filter 34 of sponge or the like to prevent dust from entering from outside into tube 7. Valve 30 acts in such a manner that when the pressure within tube 7 becomes vacuum, rubber cap 33 is turned to the position shown by the solid line to allow air to rapidly flow from outside into tube 7 while when the pressure within tube 7 becomes higher than the atmosphere, the valve maintains the pressure within tube 7 constant while allowing the pressure within tube 7 to slowly equal the atmospheric pressure with the aid of through hole 32.

Figure 11:
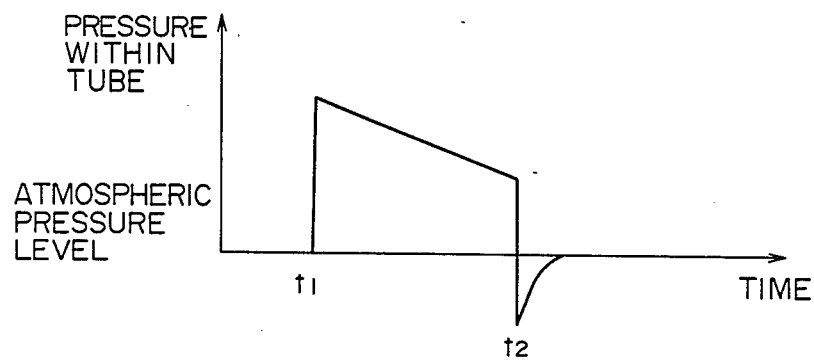
FIG. 11 is a timing chart showing changes in the air pressure within a tube of the control apparatus according to the second embodiment.

When one arm of a passenger, a baggage or the like is gotten between window glass 2 and frame 4 at a time t1 during closing of window glass 2, portion of tube 7 is pressed and the pressure within the tube rises, as shown FIG. 11. Therefore, this change in the pressure is sensed by pressure sensor 10, the output level of which increases. This change in the output is amplified by amplifier 11 and is delivered to differentiating circuit 13 which in turn delivers a rapidly rising signal to comparator 14. Thus when the differentiated signal exceeds a predetermined threshold level, comparator 14 delivers a contact detection signal to control circuit 15. This causes control circuit 15 to stop driving relay X1, and to then drive relay X2. Window glass 2 is thereby switched automatically from its closed state to its opened state, thereby preventing in advance the occurrence of an accident due to closing of window glass.

Figure 12:
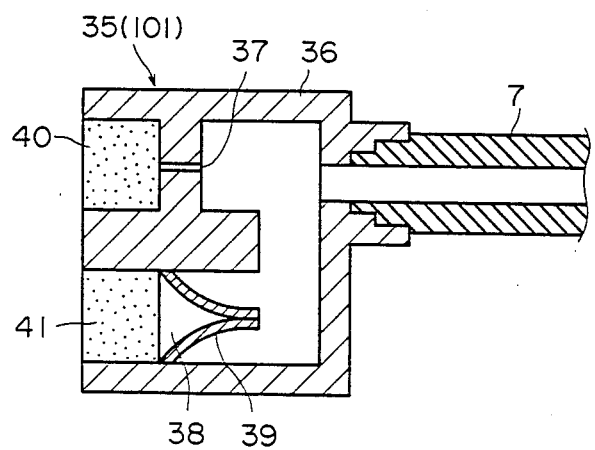
FIG. 12 is a cross-sectional view showing another example of the valve of the control apparatus according to the second embodiment.

FIG. 12 shows another example of a valve attached to one end of tube 7. In this Figure, valve 35 has a casing-like metal member 36 communicating with tube 7. Metal member 36 has through holes 37, 38 at one end portion. Through hole 37 is a small one through which air can flow, while through hole 38 allows air to flow in when the pressure within member 36 is vacuum and has a pair of rubber pieces 39 contacting at one end thereof. Through holes 37, 38 have filters 40, 41, respectively, between their outside and inside. Also, in this case, air usually flows in through small through hole 37, so that the pressure within tube 7 is maintained equal to the atmospheric pressure. When contact occurs, the tube pressure rapidly increases and the contact can be detected. After the contact, the pressure within tube 7 becomes vacuum, rubber piece 39 expands and the air rapidly flows in from outside. Thus the pressure within tube 7 can equal the atmospheric pressure. Therefore, the dead time for the contact can be shortened and when contact with tube 7 occurs, the closing function can be stopped in a short time.

EMBODIMENT 3

Figure 13:
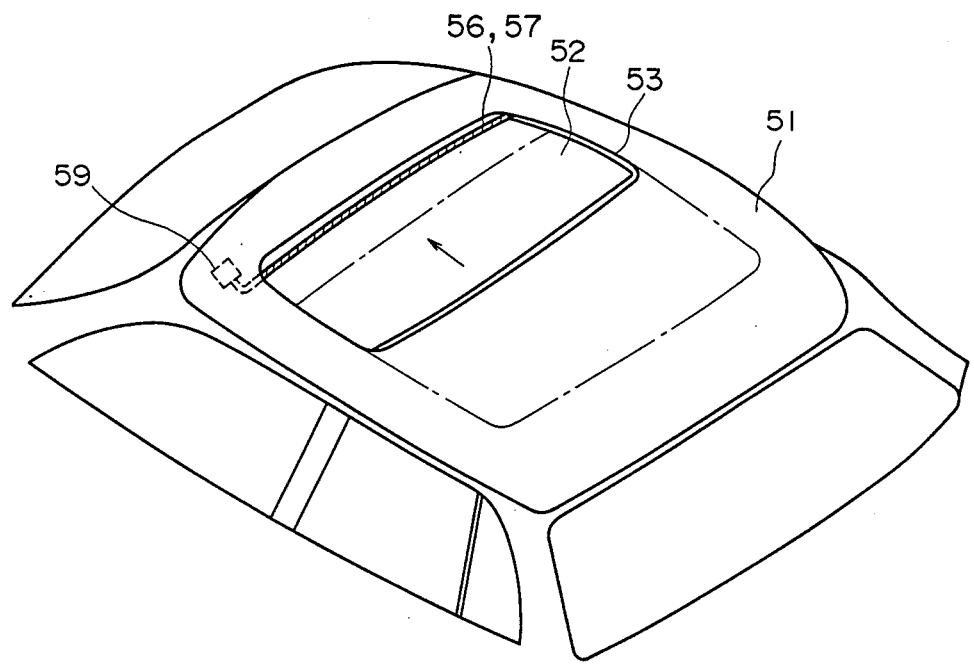
FIG. 13 is a perspective view showing a sunroof to which a contact sensitive control apparatus according to a third embodiment of this application is applied.
Figure 14:
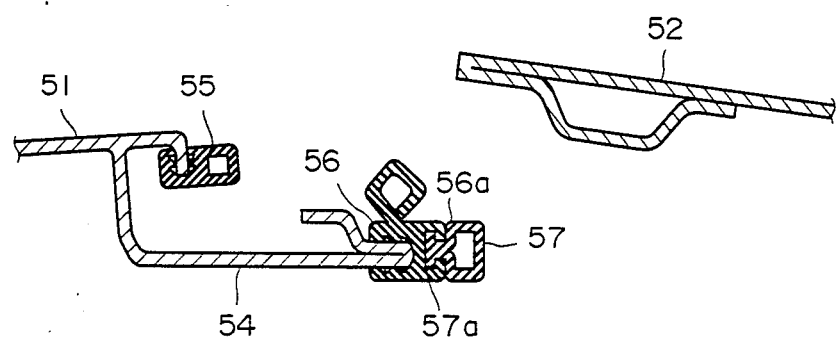
FIG. 14 is an enlarged cross-sectional view of a roof front edge of the third embodiment.

This embodiment is a roof portion of a vehicle to which a contact sensitive control apparatus according to the invention is applied with a tube being removably attached. FIG. 13 is a cross-sectional view showing an enlarged roof portion of a vehicle. In this Figure, provided within a roof 51 of the vehicle is a roof drive which back and forth slides a sliding roof 52 along a rail 53 to open and close the roof. Sliding roof 52 is autmatically opened and closed by a control input from outside. Weather strips 55 and 56 which serve as a seal member for the roof panel of the vehicle body when the sunroof is closed, as shown in FIG. 14, are attached to the frame of the sunroof which contacts the front end of sliding roof 52 when same is closed. An air tube is formed in each weather strip 55, 56 and maintains the vehicle inside airtight when the weather trips are pushed against sliding roof 52.

Figure 15:
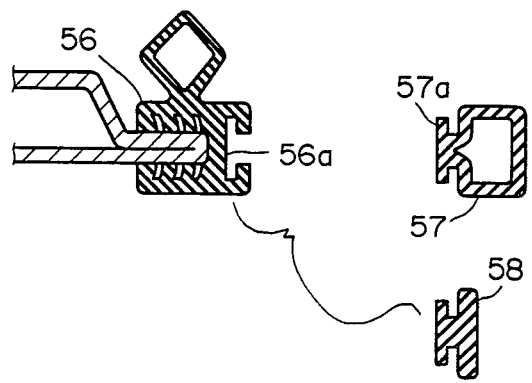
FIGS. 15, 16 and 17 are cross-sectional views showing different examples of a weather strip and a tube mounted by a frame of the sunroof according to the third embodiment.

In this embodiment, a recess 56a is formed which extends all the way around inside weather strip 56, as shown in FIG. 15. As shown cross-hatched in FIG. 13, a hollow tube 57 of soft rubber, shown in FIG. 15, is connected to only a front end of weather strip 56. Tube 57 has on its left side upper and lower protrusions 57a inserted and fixed in recess 56a in weather strip 56. Tube 57 is mounted along the front edge of frame 54 of the sunroof, as shown cross-hatched in FIG. 13, by pressing fit protrusions 57a into recess 56a in weather strip 56. An adapter 58 of soft rubber having at one end a shape complementary to recess 56a in weather strip 56, for example, as shown in FIG. 15, is pressed fit into and fixed to each of other three sides of weather strip 56 which will be the frame of the sunroof. Provided within the vehicle roof is a controller 59 communicating with tube 57. The structure of controller 59 and the roof drive is the same as that of the first embodiment, so that description will be omitted. Also in this case, when a baggage or the like contacts one end of the sunroof while same is being closed, the sunroof is controlled so that the closing of the sunroof is at once stopped because tube 57 is pressed, and the opening of the sunroof is started.

Figure 16:
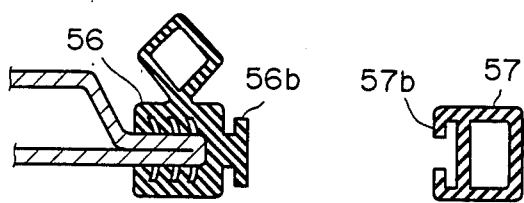

While in t his embodiment the recess provided in weather strip 56 of the sunroof fixes tube 57 thereon, a protrusion 56b may be provided all the way around inside weather strip 56, as shown in FIG. 16. In this case, one end of tube 57 is provided with a recess 57b corresponding to protrusion 56b, and tube 57 fits over the front edge of the sunroof.

Figure 17:
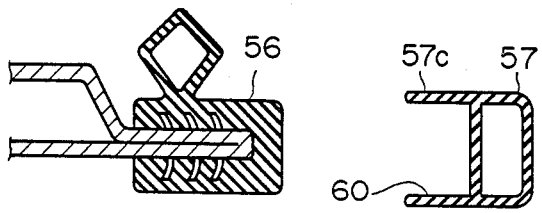

Alternatively, as shown in FIG. 17, instead of working weather strip 56, as described above, the side 57c of tube 57 may be formed so as to have a U-like cross section, inside which a metal member 60 having a U-like cross section is inserted. This assembly is then fitted in place over weather strip 56, and joined thereto to fix tube 57 to the sunroof frame.

Figure 18:
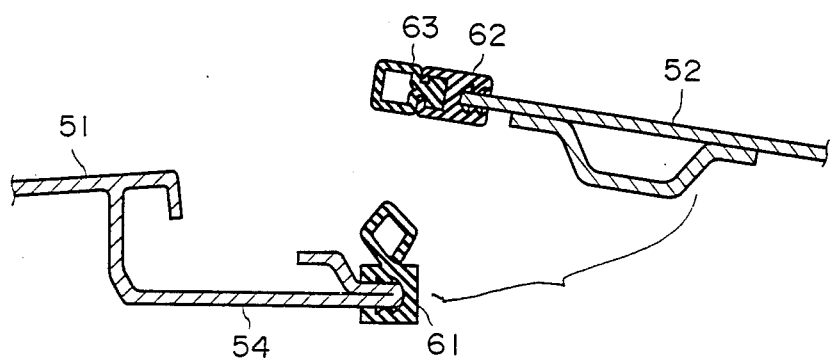
FIG. 18 is an enlarged cross-sectional view showing another example of the roof front end of the control apparatus according to the third embodiment.

While in this embodiment the tube 57 is provided on the frame fixed to the roof of the sunroof so as to provide a contact signal indicative of contact with the sunroof from a change in the pressure within the tube, weather strips 61, 62 may be provided at the front edges of frame 54 and sliding roof 52, as shown in FIG. 18, and tube 63 having a structure similar to that of FIG. 15 may be attached to the front surface of weather strip 62. Also, in this case, controller 59 is connected to tube 63 as in the previous embodiment. This allows changes in the pressure within tube 63 to detect contact with sliding roof 52 to stop closing the sunroof and to prevent injury and damage in advance.

EMBODIMENT 4

Figure 19:
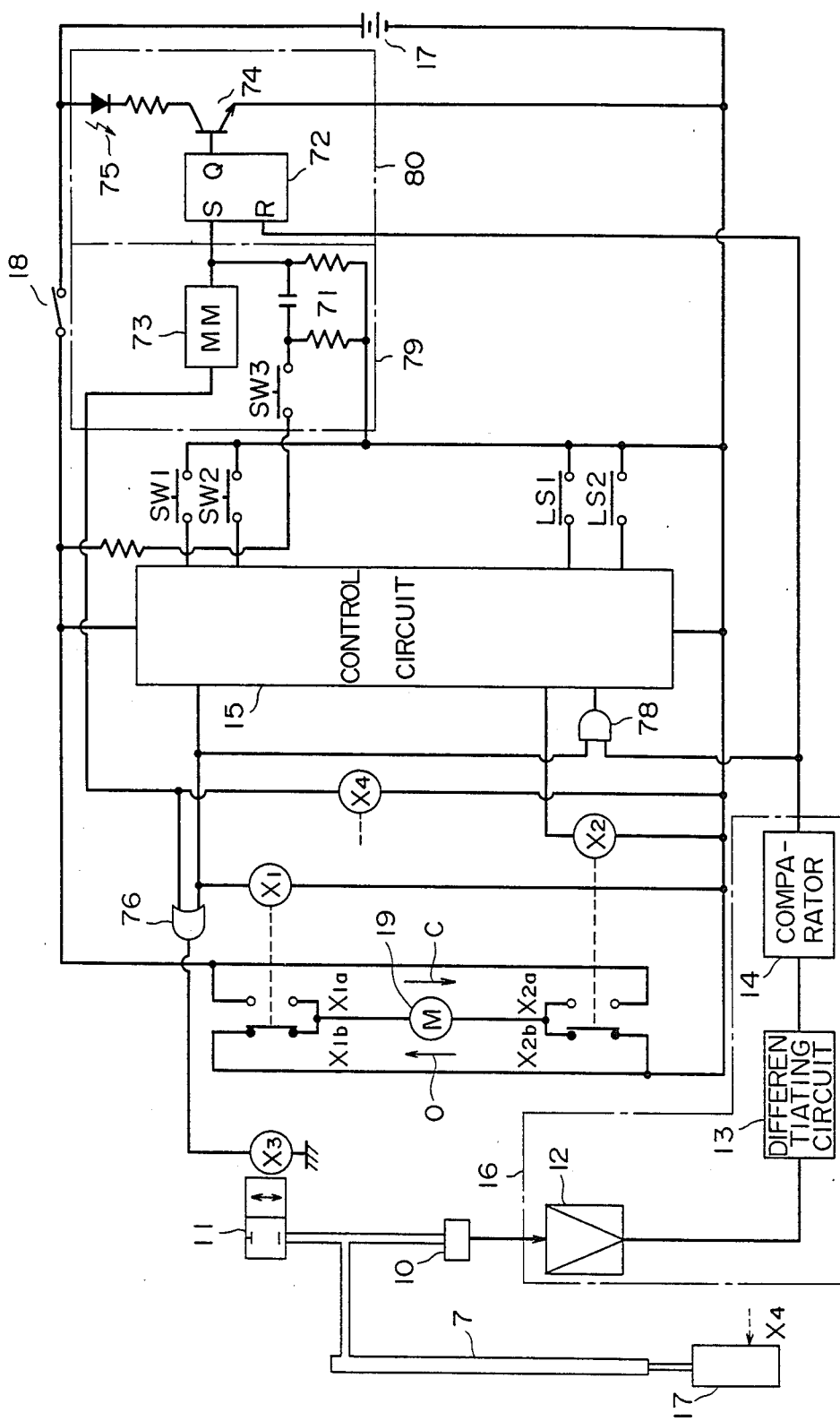
FIG. 19 is a circuit diagram showing an electric structure of a contact sensitive control apparatus according to a fourth embodiment of the application.

FIG. 19 is a circuit diagram of a contact sensitive control apparatus according to a fourth embodiment of the invention. In the previous embodiments, if the tube should be broken, contact could not be sensed. In this embodiment, whether a contact sensitive operation is performed with reliability is ascertained or monitored. In this embodiment a switch SW3 is provided which is operated during monitoring. The output of switch SW3 is connected to a differentiating circuit 71 comprising a CR which delivers a set signal to a RF flip-flop 72 when switch SW3 is pressed while delivering a triggering signal to a one shot multivibrator 73. The output of comparator 14 is given as a reset input to this flip-flop 72. Flip-flop 72 is set when monitoring is performed by pressing switch SW3, and activates a light emitting diode 75 via a transistor 74. One short multivibrator 73 supplies a one shot output via an OR gate 76 to electromagnetic coil X3 of electromagnetic valve 11, and drives electromagnetic coil X4 of an electromagnetic pump 77. Electromagnetic valve 11 opens tube 7 when relay X1 is deenergized, and closes tube 7 when relay X1 is energized and when monitoring is performed. Electromagnetic pump 77 temporarily applies pressure to tube 7 by energization of electromagnetic coil X4. The output of comparator 14 is delivered via an AND gate 78 to control circuit 18. The other structural points are the same as in the first embodiment. Switch SW3, differentiating circuit 71 and one short multivibrators 73, 76 constitute a monitor input means 79 which drives electromagnetic pump 77. Flip-flop 72, transistor 74 and light emitting diode 75 constitute a dispaly means 80 displaying an abnormality in the tube.

Figure 20:
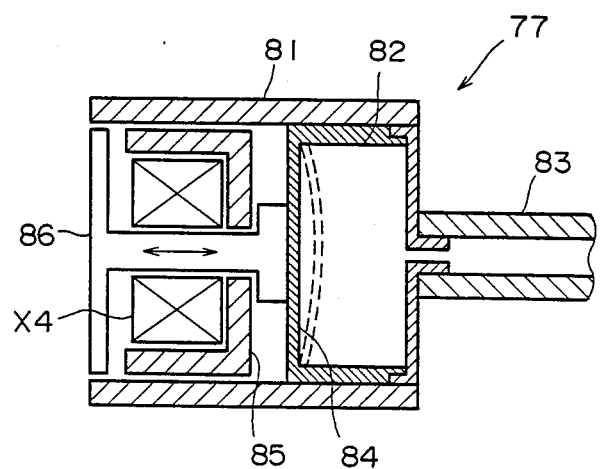
FIG. 20 is a cross-sectional view showing an example of an electromagnetic pump used in the fourth embodiment.

Electromagnetic pump 77 includes an air chamber 82 and a solenoid within frame 81, as shown in FIG. 20. Air chamber 82 is connected to one end of tube 7 via a duct 83 and has a diagram 84 on one surface. Provided within frame 81 are a relay coil X4 wound on a coil spool 85 and a plunger 86 slidable right and left along the axis of coil X4. When electromagnetic coil X4 is energized, plunger 86 pushes diagram 84 in air chamber 82 to deform it, as shown in the broken like, to thereby apply a constant pressure to tube 7. Elecromagnetic pump 17 may be constructed so that the tube is pressed at one end by a solenoid.

Also in this embodiment, it is arranged that during the normal opening and closing operations, tube 7 is closed by electromagnetic valve 11, a change in the pressure within tube 7 is sensed on contact with the tube to switch automatically from its closed state to its opened state. When switch SW3 of monitor input means 79 is pressed for monitoring purposes, differentiating circuit 71 provides a differentiated output to flip-flop 72 and one shot multivibrator 73 to light a light emitting diode 75 via transistor 74. The output of one shot multivibrator 73 drives current valve 11 via OR gate 76 to close tube 7 while energizing electromagnetic coil X4 to drive electromagnetic pump 77. Therefore, as shown in FIG. 20, plunger 86 of electromagnetic pump 77 pushes diapfragm 84 to apply pressure to tube 7. A change in the pressure is sensed by pressure sensor 10, the output level of which rises. Thus a detection signal is obtained via differentiating circuit 13 and comparator 14, flip-flop 72 is reset and light emitting diode 75 stops emitting light. This shows that the contact sensitive control apparatus correct senses an increase in the pressure, thereby detecting the contact. However, if an increase in the pressure is not detected for some reason, diode 75 of display means 80 does not stop emitting light, so that an abnormality in the contact sensitive control apparatus can be ascertained.

This embodiment uses a light emitting diode as an indicator of the display means. Of course, it may use a report means such as an electronic buzzer. While the electromagnetic pump has been described as applying a pressure to one end of the tube, arrangement may be such that a solenoid pushes the side wall of the tube.

EMBODIMENT 5

Figure 21:
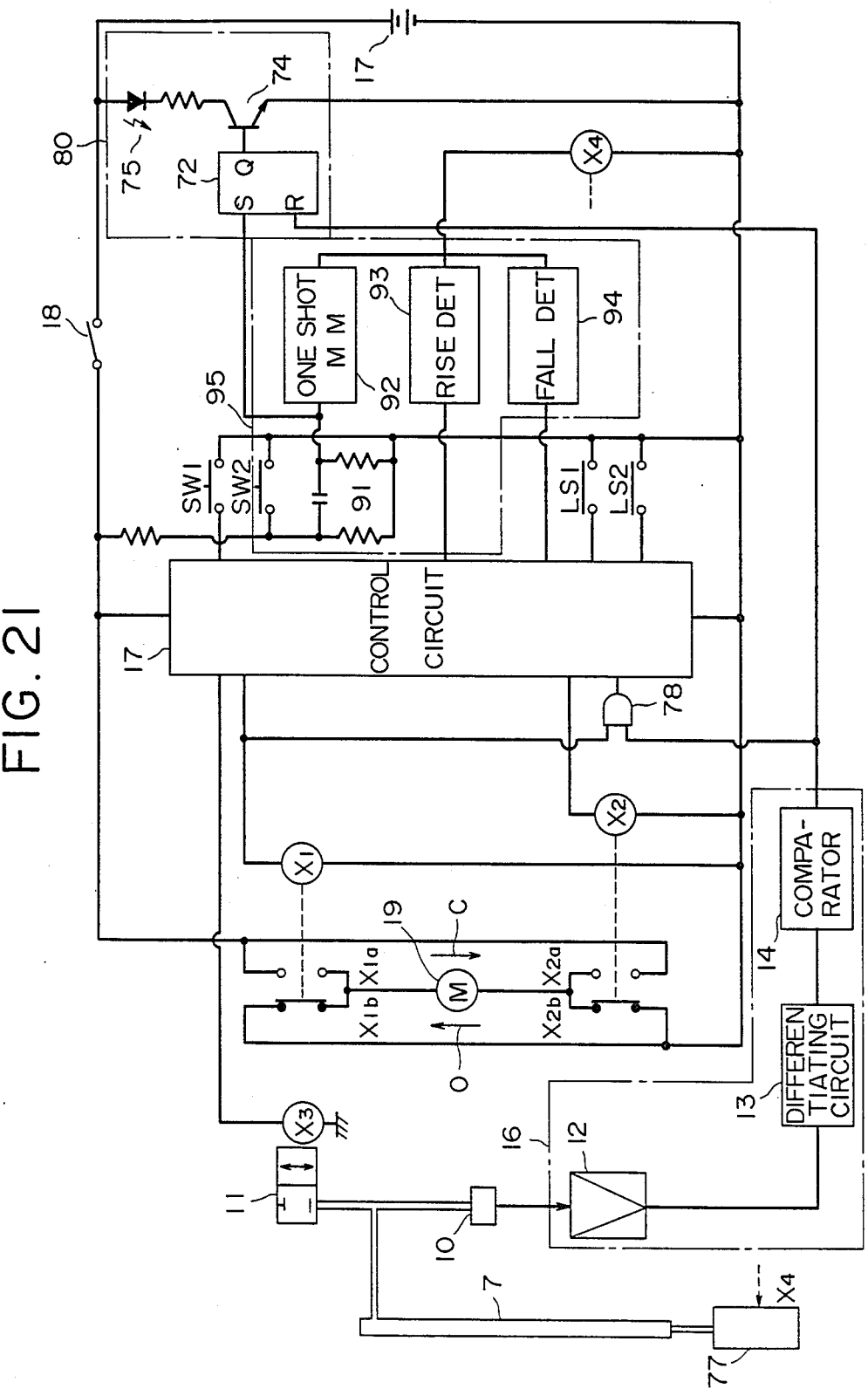
FIG. 21 is a circuit diagram showing the structure of a contact sensitive control apparatus according to a fifth embodiment of this application.

While in the fourth embodiment a monitor switch is provided independently, the monitoring operation may be performed throughout during the time when the closing is performed. FIG. 21 shows the main portion of a contact sensitive control apparatus constructed in this way. In this Figure, a closing switch SW2 has a differentiating circuit 91, the output of which activates a one shot multivibrator 92 which produces an output delivered to a rise detector 93 and a fall detector 94 and further to an electromagnetic coil X4 of electromagnetic pump 77 to energize same. Rise detector 93 detects a rise output from vibrator 92 to produce a closing signal to the control circuit while fall detector 94 produces a driving signal of relay X1 to control circuit 15 in accordance with a fall signal from multivibrator 92. Control circuit 15 receives the output of switch SW2 from rise and fall detectors 93 and 94 to energize relays X3 and x1, respectively. In this embodiment, switch SW2 and differentiating circuit 91, one shot multivibrator 92 and rise and fall detectors 93 and 94 constitute a monitor input means 95 which activates a monitor section. The other structural points are similar to the fourth embodiment shown in FIG. 19.

Figure 22:
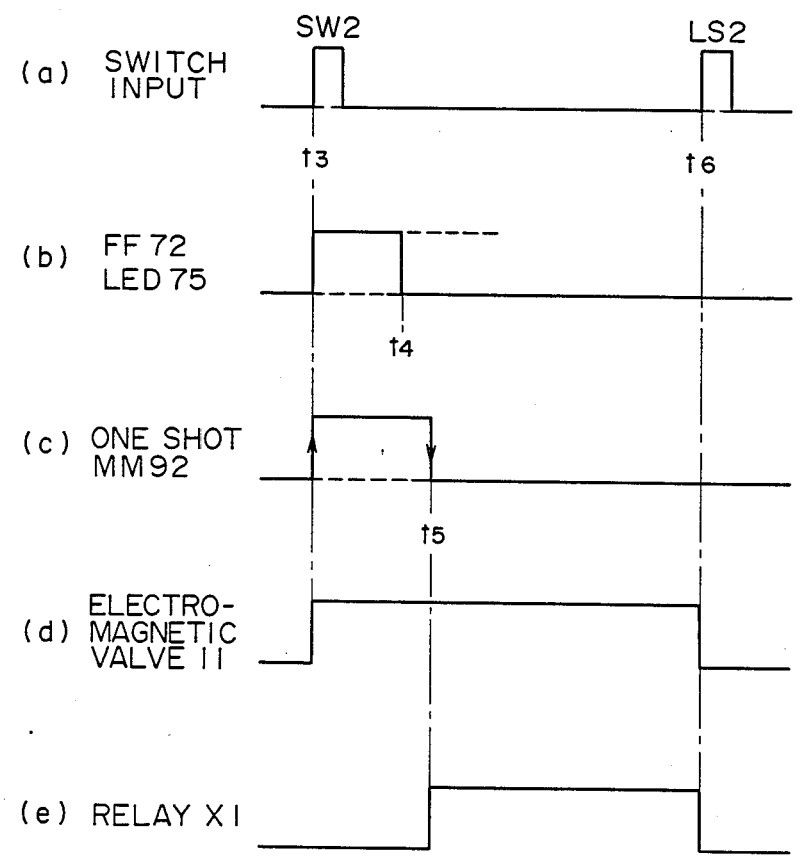
FIG. 22 is a timing chart showing the operation of the contact sensitive control apparatus according to the fifth embodiment of this application.

Now the operation of this embodiment will be described with reference to a timing chart of FIG. 22(a). First, as shown in FIG. 22(a), when switch SW2 is pressed at a time t3, a differentiated output is delivered via differentiating circuit 91 to flip-flop 72 to set same to thereby light the light emitting diode 75. The differentiation signal is also applied simultaneously to one shot multivibrator 92, as shown in FIGS. 22(c), (d). A rise signal from vibrator 92 drives relay X4 of electromagnetic pump 77. At the same time, rise detector 93 delivers a closing signal to control circuit 15. On the basis of the closing signal, control circuit 15 closes electromagnetic valve 11 to keep tube 7 airtight. Therefore, a pressure is applied to the airtight tube 7, an increase in the pressure within tube 7 is sensed by pressure sensor 10, the output level of which increases. Therefore, a contact detection signal is obtained via differentiating circuit 13 and comparator 14, so that flip-flop 72 is reset and light emitting diode 75 is put out at a time t4. Thereafter if the output of multivibrator 92 becomes "L" at a time t5, a fall of the signal is detected by fall detector 94 and delivered to control circuit 15. This causes relay coil X1 to be energized, as shown in FIG. 22(e), so that a current flows through motor 19 in the direction of the arrow C to raise window glass 2.

If tube 7 is damaged, pressure sensor 10 does not sense an increase in the pressure, and comparator 14 does not provide a signal, light emitting diode 75 continues to light without being put out, as shown by the broken line in FIG. 22(b) so that it is displayed that there is an abnormality in the contact sensitive control apparatus. By this arrangement, the operation of the contact sensitive control apparatus can beforehand be ascertained before the window glass is raised.

When the closing of the window is completed, limit switch LS2 produces a closing completion signal to control circuit 15 to thereby stop relay X1 and deenergize electromagnetic valve 11 to open tube 7. If switch SW1 delivers an opening signal to control circuit 15 when window glass 2 is opened, relay X2 is energized to close its normally open contact X2a, so that a current flows through motor 19 in the direction of the arrow O to open window glass 2.

EMBODIMENT 6

Figure 23:
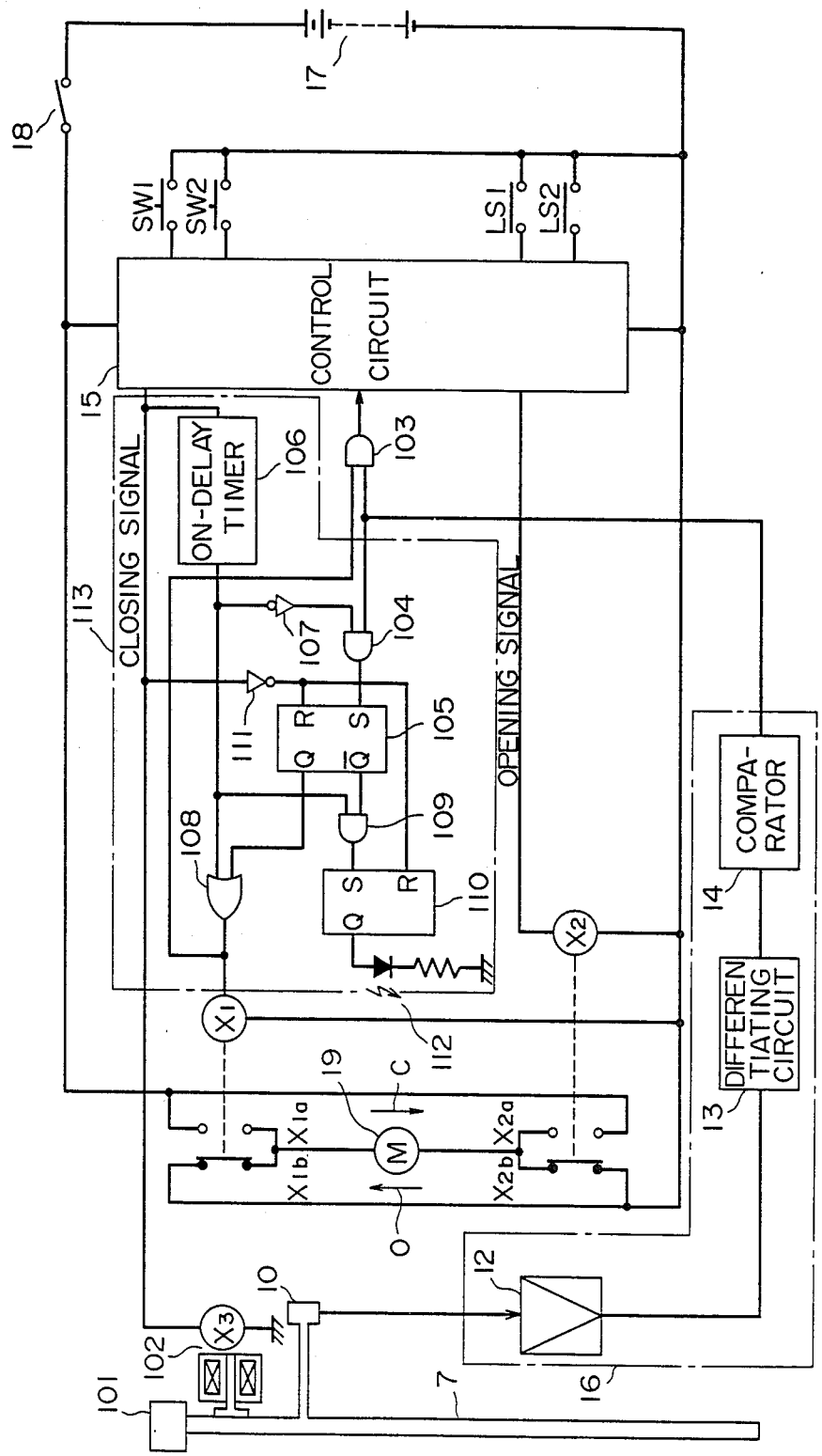
FIG. 23 is a circuit diagram showing an electrical structure of a contact sensitive control apparatus according to a sixth embodiment of this embodiment.

This embodiment shows a contact sensitive control apparatus which simultaneously performs application of pressure to tube 7 and closing tube 7 using a solenoid. In this embodiment, as shown in FIG. 23, a valve 101 and a solenoid 102 are provided at one end of tube 7 for allowing the outside air to flow in when the pressure within tube 7 becomes vacuum and for allowing the air to slowly flow out when the pressure within tube 7 is positive. Valve 101 may be, for example, a valve similar to shown in FIG. 12 while solenoid 102 applies a pressure to the tube and seals the tube itself when solenoid 102 is energized. In this embodiment, a detection signal from comparator 14 is delivered via AND gates 103, 104 to control circuit 15 and flip-flop 105, respectively. The structure of control circuit 15 is similar to that of the first embodiment. A closing signal from control circuit 15 is delivered to solenoid 102 and an on-delay timer 106. On-delay timer 106 produces a signal which delays a closing signal from control circuit 15 by a small time during which the sealed state of tube 7 is ascertained. The signal from timer 106 is delivered via an inverter 107 to an AND gate 104 and an OR gate 108. A flip-flop 105 is set on the basis of the comparison output from comparator 14, thereby inverting the flip-flop to energize the relay coil of relay X1 via an OR gate 108. The output of OR gate 108 is connected to an input terminal of AND gate 103 so that contact detection signal is delivered to control circuit 15 during the closing. The $\overline{Q}$ output from flip-flop 105 is delivered via AND gate 109 to the set input terminal of a flip-flop 110. The closing signal from control circuit 15 is delivered via an inverter 111 to the reset input terminals of flip-flops 105, 110. Flip-flop 110 is set to light an alarm display light emitting diode 112 when tube 7 is damaged and its inside pressure does not rise even if pressure may be applied thereto.

On-delay timer 106, inverters 107, 111, AND gates 104, 109, OR gate 108, flip-flops 105, 110, and light emitting diode 112 constitute a damage detection means 113 of this embodiment.

Figure 24A:
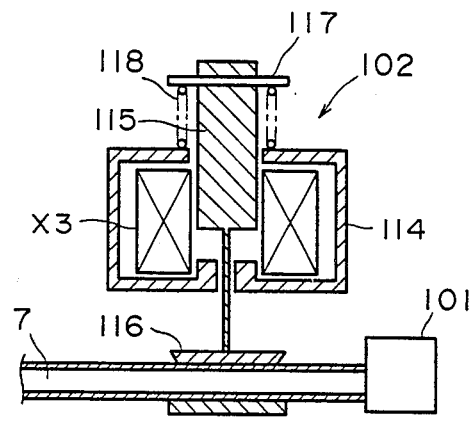
FIG. 24(a) is a cross-sectional view showing the structure of a solenoid used in the sixth embodiment.
Figure 24B:
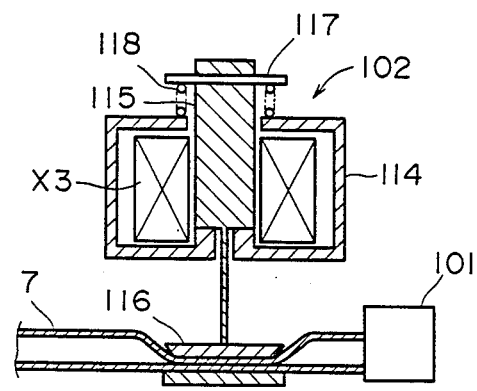
FIG. 24(b) is a cross-sectional view showing the state of the solenoid when actuated.

FIG. 24(a) shows the structure of a solenoid 102. In this Figure, solenoid 102 has an electromagnetic coil X3 in a yoke 114 and a movable core 115 slidable along the central axis of coil X3. A pusher 116 is provided on the tube 7 side of movable core 115 for pushing tube 7. Movable core 115 has a flange 117 fixed thereto, and is resiliently held at its upper end by a spring 118 provided between flange 117 and yoke 114, as shown in FIG. 24(a), so that pusher 117 contact tube 7. In solenoid 102, when electromagnetic coil X3 is energized, movable core 115 is moved downwardly along its axis, as shown in FIG. 24(b), to thereby apply pressure to, press and close tube 7.

Figure 25:
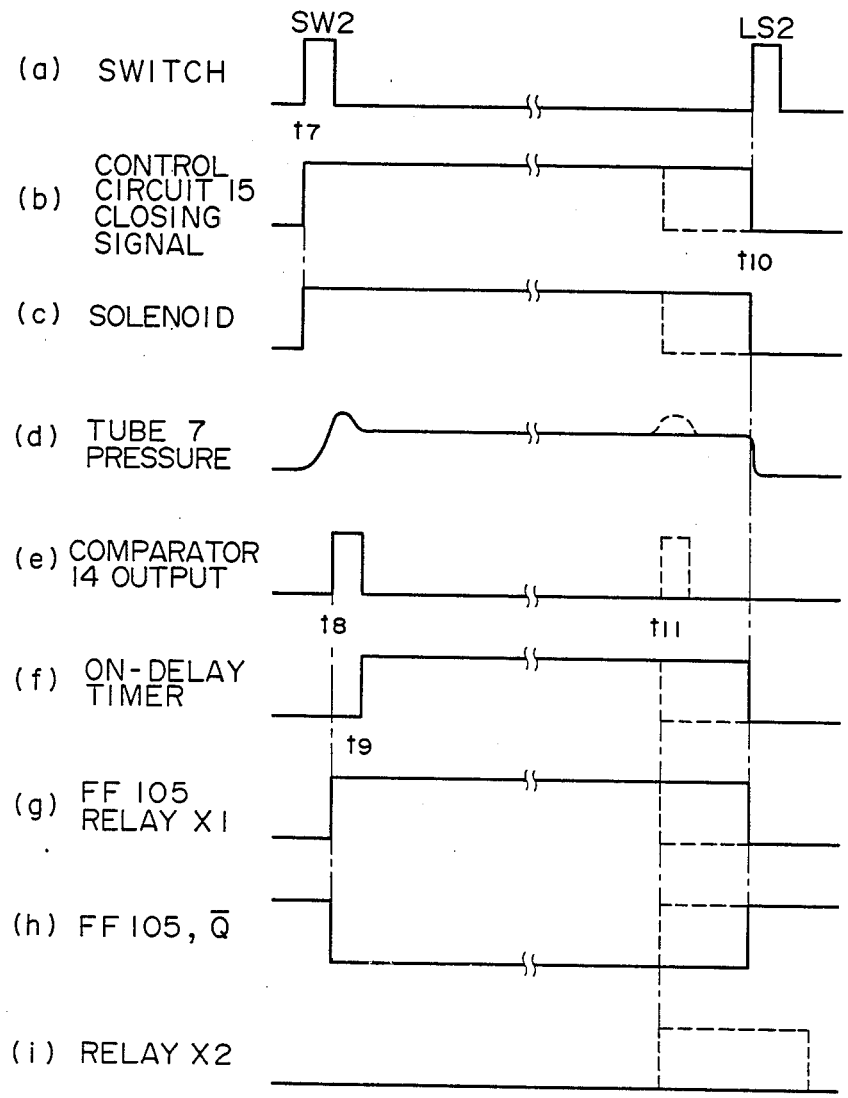
FIG. 25 is a timing chart showing the operation of the respective portions of the sixth embodiment when the tube is not damaged.
Figure 26:
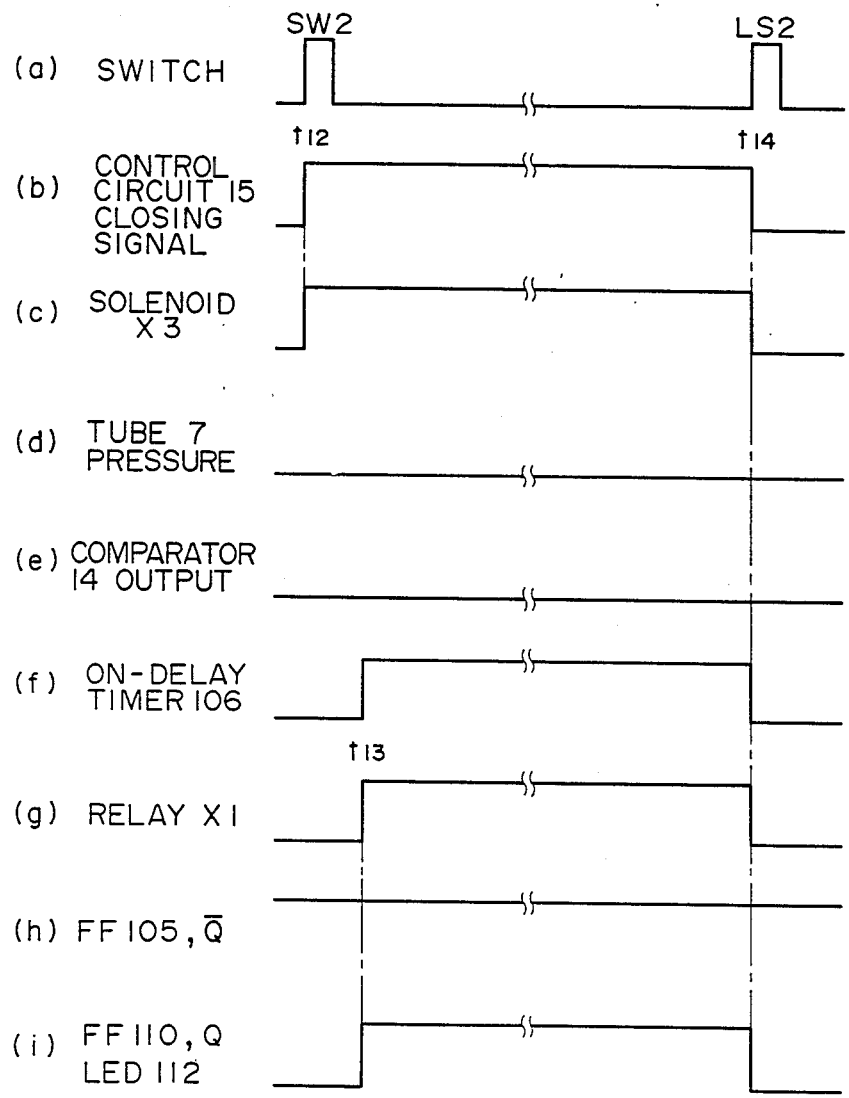
FIG. 26 is a timing chart showing the waveforms of the respective portions of the sixth embodiment when the tube is damaged.

The operation of this embodiment will now be described with reference to the timing chart of FIGS. 25 and 26. Tube 7 is normally open via through hole 37 in valve 101 to the atmosphere because it is normally not pressed by solenoid 102, and the pressure within tube 7 is equal to the atmospheric pressure. When window glass 2 of door 1 is to be closed, switch SW2 delivers a closing input signal to control circuit 15 at a time t7, as shown in FIG. 25(a). As shown in FIGS. 25(b), (c), control circuit 15 outputs a closing signal to energize solenoid 102. This causes the pusher 112 of solenoid 102 to press tube 7, as shown in FIG. 24(b), so that the pressure within tube 7 rises, as shown in FIG. 25(d). If tube 7 is completely pressed, it is sealed. Thus a change in the pressure is sensed by pressure sensor 12, and the change quantity is sensed by differentiating circuit 13. At the time t8 when an increase in the pressure exceeds a predetermined threshold level, comparator 14 produces an output, as shown in FIG. 25(e). The output from comparator 14 is delivered to AND gates 103, 104.

Since one input to AND gate 103 is at "L" level and one input to AND gate 104 is at "H" during a delay time by on-delay timer 106 until a time t9, as shown in FIG. 25(f). Therefore, the comparison output is applied to the set input terminal of flip-flop 105 to invert same. Thus the Q output of flip-flop 105 is delivered via OR gate 108 to relay coil X1 to energize same, thereby closing its normally open contact X1a. Thus a current flows through motor 19 in the direction of the arrow C to raise window glass 2.

Limit switch LS2 produces a closing completion signal to control circuit 15 at a time t10 when the closing of the window is completed. The closing signal from control circuit 15 then changes to "L" level to stop the energization of on-delay timer 106. Thus, as shown in FIG. 25(g), flip-flop 105 is inverted to stop the energization of relay coil X1, thereby stopping the raising of window glass 2. This causes energization of electromagnetic coil X3 of solenoid 102 to stop, so that spring 118 returns the core to the position shown in FIG. 24(a) to open the tube again to the atmosphere.

If switch SW1 delivers an opening input signal to control circuit 15 when window glass 2 is opened, an opening signal from control circuit 15 energizes relay X2 to close its normally open contact X2a, so that a current flows through motor 19 in the direction of the arrow O to open window glass 2.

If an arm of a passenger, a baggage or the like is gotten between window glass 2 and frame 4 at a time t11 when window glass 2 is being closed, the air pressure within tube 7 rises because tube 7 is closed, as shown in FIG. 24(b). Thus this change in the air pressure is sensed by pressure sensor 10, the output level of which increases. This signal is amplified by amplifier 12 and a quantity of the pressure change is delivered via differentiating circuit 13 to comparator 14. Thus when the differentiated output exceeds a predetermined threshold level, a contact detection signal from comparator 14 is delivered to AND gates 103, 104. During closing of the window, relay coil X1 is energized, and a signal having a "H" level is delivered from OR gate 108 to AND gate 103. Thus the output from comparator 14 is delivered as a contact detection signal to control circuit 15. Thus the closing signal is at once stopped to thereby stop energization of electromagnetic coil X3 of solenoid 102 and relay X1, and then energize relay X2, as shown by the broken line in FIG. 25(i). Therefore, normally closed contact X1b of relay X1 and normally open contact X2a of relay X2 are closed and a current flows through the opening and closing motor 19 in the direction of the arrow O. Window glass 2 is thus switched automatically from its closed state to its opened state. Consequently, control can be performed so that even if a hand or the neck of a passenger or the like may be pinned by window glass 2, this can be detected by the compression of tube 7 to thereby stop the closing of the window glass at once and open the window glass.

Even if tube 7 may be pressed by solenoid 102, there are instances where the internal pressure of tube 7 does not rise because tube 7 happens to be damaged. FIG. 26 is a timing chart when the tube is already damaged. When switch SW2 delivers a closing input signal to control circuit 15 at a time t12, control circuit 15 delivers a closing signal to on-delay timer 106 and electromagnetic coil X3 of solenoid 102. These operations are similar to those shown in FIGS. 25(a)–(c). At this time, as shown in FIGS. 26(d), (e), although solenoid 102 is used to apply a pressure to tube 7, the pressure within tube 7 does not rise and comparator 14 does not provide a comparison output. Therefore, as shown in FIGS. 26(f), (g), relay coil X1 is energized via OR gate 108 at a time t13 after the delay time of on-delay timer 106, thereby closing window 2. At this time, flip-flop 105 is throughout in its reset state, as shown in FIGS. 26(h), (i), so that flip-flop 110 is set by the output of on-delay timer 106 to thereby light the alarm light emitting diode 112. Therefore, a damage to tube 7 can be reported to the driver.

EMBODIMENT 7

Figure 27:
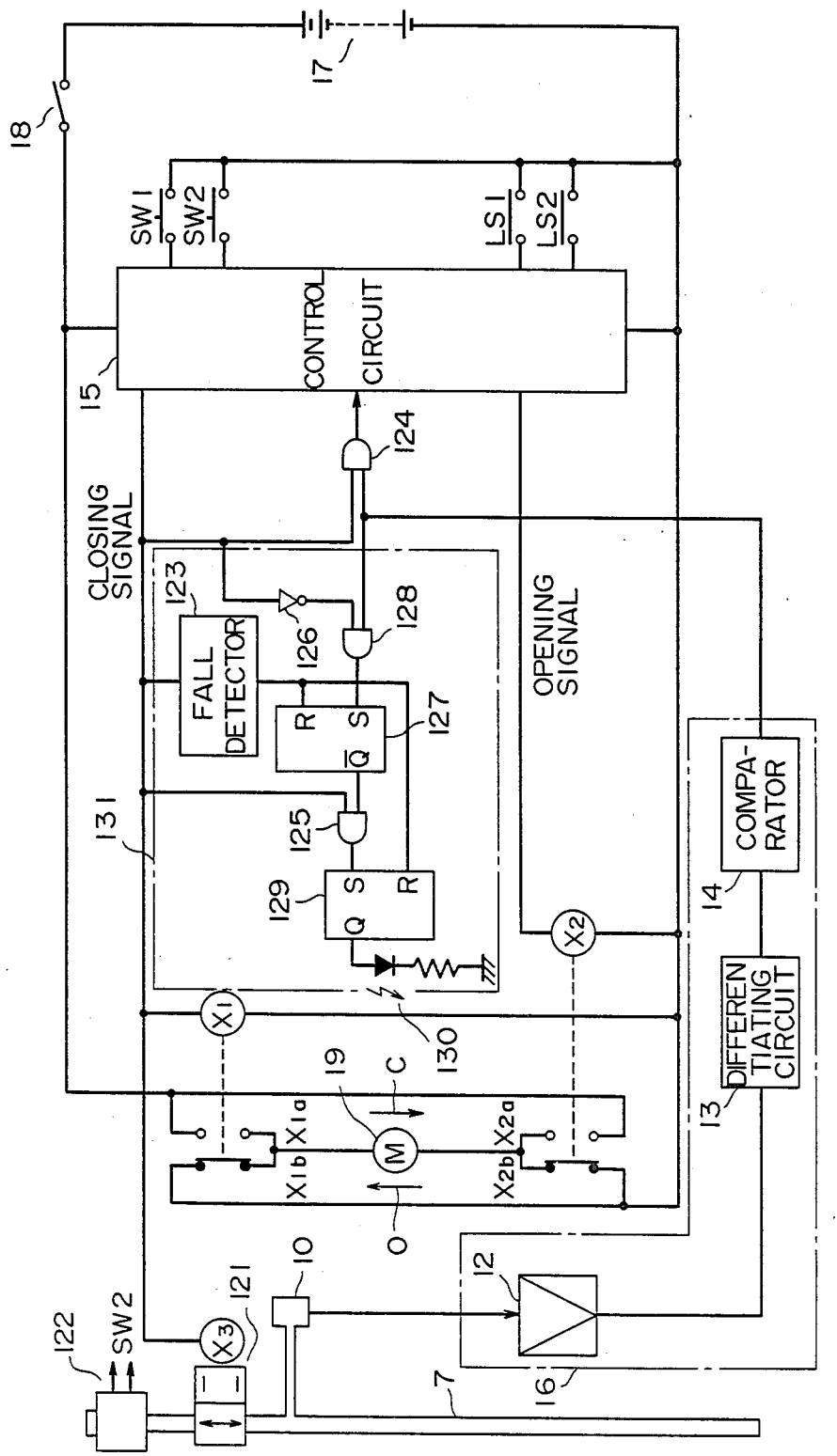
FIG. 27 is a circuit diagram showing the electrical structure of a contact sensitive control apparatus according to a seventh embodiment of this application.

In this embodiment, a switch itself which delivers a closing input applies a pressure to tube 7. The structure for this is shown in FIG. 27. In this Figure, an electromagnetic valve 121 and a push button switch 122 are provided in communication with tube 7. Valve 121 shuts off switch 122 from tube 7 when closed. Push button switch 122 applies pressure to, and closes one end of, tube 7 when the window is closed. The fact that pressure sensor 11 is connected to tube 7 and that the output of pressure sensor 11 is delivered via differentiating circuit 13 and comparator 14 to control circuit 15 is similar to the first embodiment. In the present embodiment, a closing signal from control circuit 15 is delivered to relay coil X1, relay coil X3 of electromagnetic valve 121, a rise detector 123, AND gates 124, 125, and an inverter 126. A flip-flop 127 is set on the basis of the comparison output from comparator 14 via AND gate 128 when no closing signal is output. The $\bar{Q}$ output from flip-flop 127 is delivered via AND gate 125 to the set input terminal of flip-flop 129. A closing signal from control circuit 15 is also delivered via fall detector 123 to the reset input terminals of flip-flops 127, 129. Flip-flop 129 is set to light the alarm display light emitting diode 130 when the pressure within tube 7 does not rise even if a pressure may be applied to the tube because the tube is damaged.

In this embodiment, fall detector 123, AND gates 125, 128 inverter 126, flip-flops 127, 129, and light emitting diode 130 constitute a damage detector means 131 which detects a damage to the tube when it receives no detection signal from pressure detection means 16. The other points are similar to the first embodiment and no more detailed description will be given.

Figure 28:
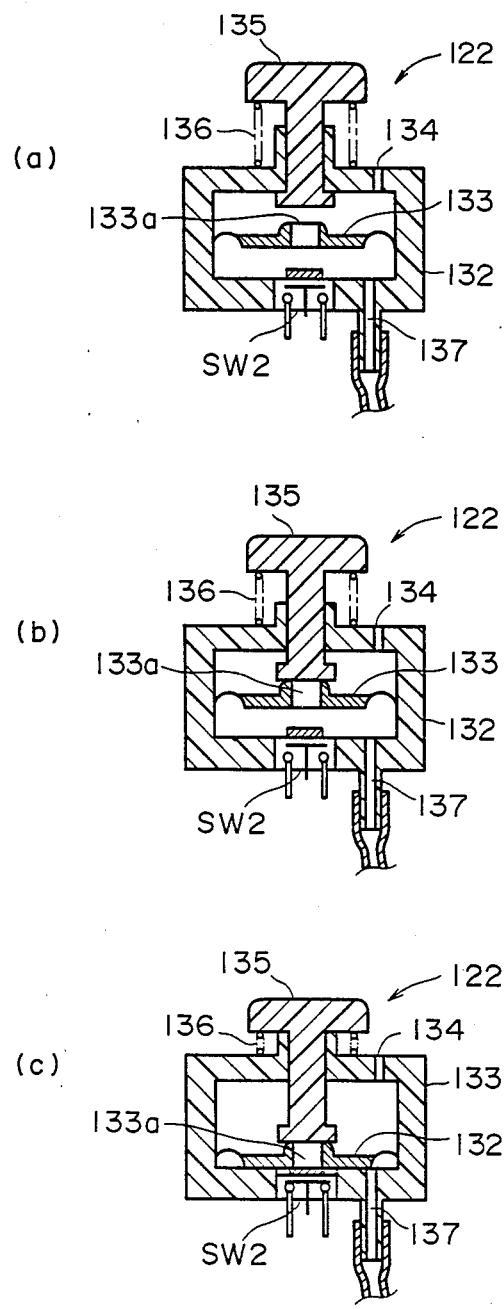
FIG. 28 is a cross-sectional view showing the structure of a push button switch used in the seventh embodiment.

FIG. 28(a) is a cross-sectional view showing the structure of a push button switch 122. In this Figure, switch 122 is of the momentary type in which a diaphragm 133 having an aperture 133a at its center within a sealed casing 132 is resiliently held by resilient members. A small through hole 134 is provided in the upper surface of casing 132. A push button 135 is fixed to the upper end of push button 135 by a spring 136 at the center axis of the casing. Provided below push button 135 is a flange opposite to aperture 133a in diaphragm 133. A duct 137 is mounted on the lower casing 132 wall and communicates with the electromagnetic valve 121 and tube 7. A small push button SW2 is embedded within the center of the lower casing surface. Push button SW2 delivers a closing input signal.

The operation of this embodiment will now be described with reference to the timing charts of FIGS. 29 and 30. Normally, push button switch 122 is at the position shown in FIG. 28(a) and electromagnetic valve 121 is open. Therefore, tube 7 is open to the atmosphere via an opening 133a of the diaphragm of push button switch 122 and an opening 134 of casing 132. The pressure within tube 7 is equal to the atmospheric pressure.

When window glass 2 of door 1 is to be closed, push button 135 of switch 122 is pressed. This causes the flange of push button 135 to close opening 133a, as shown in FIG. 28(b), diaphragm 133 is then lowered, as shown in FIG. 28(c), and a pressure is applied to tube 7, as shown in FIG. 29(a). Thus a change in the pressure is sensed by pressure sensor 10, and the change quantity is sensed by differentiating circuit 13. Comparator 14 produces a signal, as shown in FIG. 29(b), at a time t15 when the pressure increase exceeds a predetermined threshold level. The output from comparator 14 is applied to AND gates 124, 128, but control circuit 15 does not provide a closing signal until a time t16, as shown in FIG. 29(e), so that one input to AND gate 124 is at "L" level while one input to AND gate 128 is at "H" level. Thus the comparison output is applied to the set input terminal of flip-flop 127 to invert same, as shown in FIG. 29(c). Switch SW2 is closed at a time t16 when push button 135 of switch 122 is pressed to reach its lower stroke end, as shown in FIG. 29(c), and a closing input signal is applied to control circuit 15 which then outputs a closing signal, as shown FIGS. 29(e), (f) to energize relay coil X1. Therefore, a current flows through motor 19 in the direction of the arrow C to raise window glass 2.

At a time t17 when the closing of the window is completed, limit switch LS2 delivers a closing completion signal to control circuit 15, as shown in FIGS. 29(b)–(f), so that the closing signal from control circuit 15 becomes "L" level to stop energization of relay coil X1. This fall signal is detected by a fall detector 123 to reset flip-flops 127, 129. At the same time, the energization of electromagnetic valve 121 is stopped and tube 7 communicates with push button switch 122, so that the tube is again opened to the atmosphere via push button switch 122.

If switch SW1 delivers an opening input signal to control circuit 15 when window glass 2 is opened, the opening signal from control circuit 15 energizes relay X to close its normally open contact X2a, so that a current flows through motor 19 in the direction of the arrow O to open window glass 2.

Figure 29:
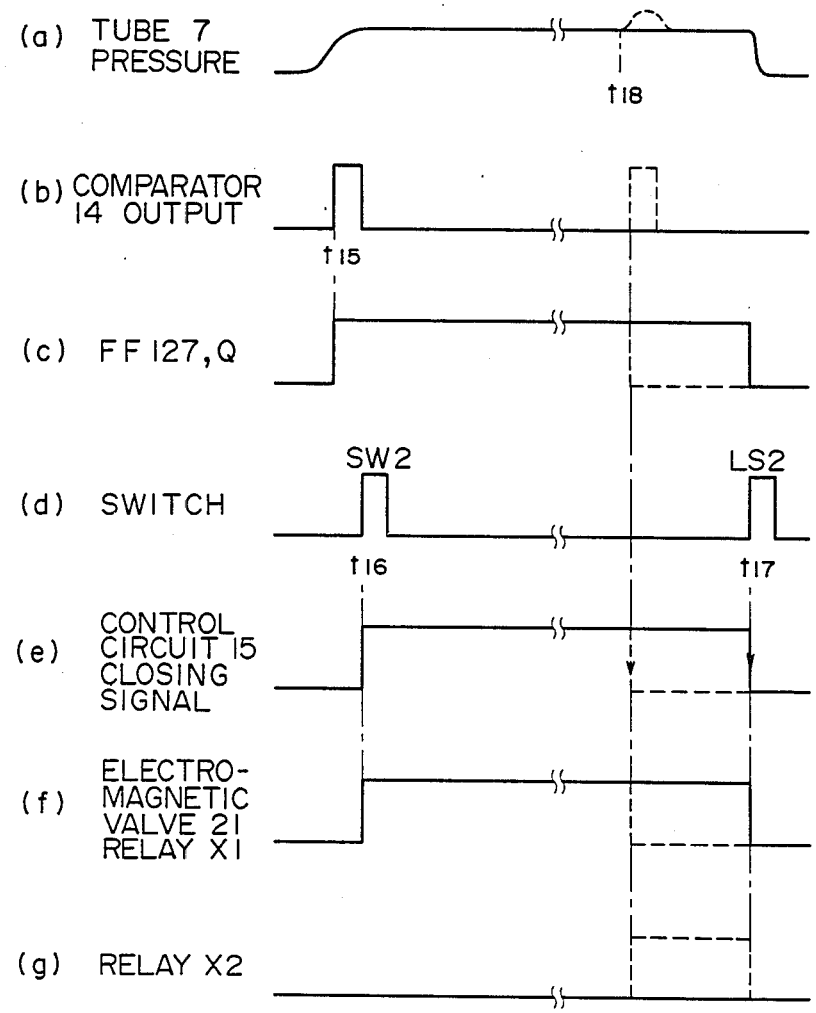
FIG. 29 ia a timing chart showing the operation of the respective portions of the seventh embodiment when the tube is not damaged.
Figure 30:
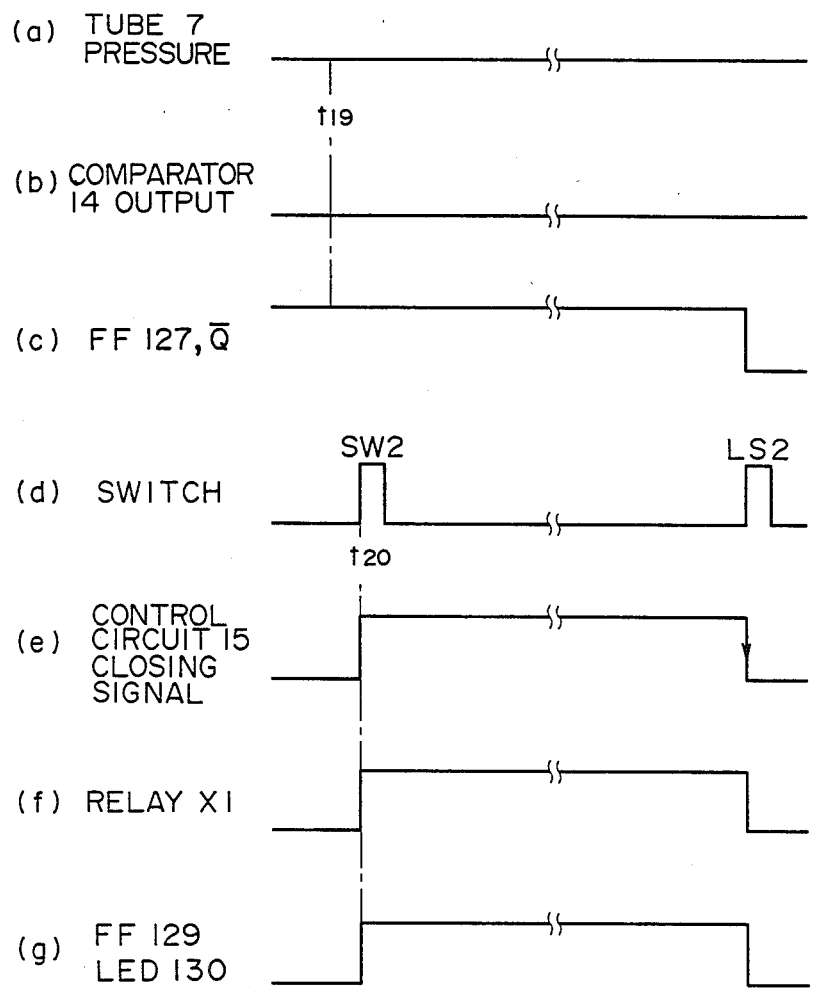
FIG. 30 is a timing chart showing the operation of the respective portions when the tube is damaged.

If an arm of a passenger, a baggage or the like is gotten between window glass 2 and frame 4 at a time t18 when window glass 2 is being closed, the pressure within tube 7 rises because tube 7 is closed, as shown by the broken line in FIG. 29. Therefore, this change in the pressure is sensed by pressure sensor 10, the output level of which increases. This signal is amplified by amplifier 12 and the change quantity is delivered via differentiating circuit 13 to comparator 14 at the next stage. Therefore, if the differentiated output exceeds a predetermined threshold level, comparator 14 outputs a contact detection signal to AND gates 124, 128, as shown by the broken line in FIG. 29(b). A closing signal is delivered to AND gate 124 during closing of the window, so that a contact detection signal is delivered as such to control circuit 15. Accordingly, the closing signal is stopped at once to deenergize relay coil X1 to drive relay X2. Window glass 2 is thereby controlled so that it is switched automatically from its closed state to its opened state.

There are instances when tube 7 is damaged and will be not sealed even if push button switch 122 may be pressed. FIG. 30 is a timing chart when tube 7 is damaged. Even if push button switch 122 may be pressed at a time t19, the pressure within tube 7 does not rise, as shown in FIGS. 30(a), (b), and comparator 14 does not provide a detection signal. Thus, as shown in FIG. 30(c), the $\overline{Q}$ of flip-flop 127 is at "H" level. When push button switch 122 is pressed to its lower stroke end, as shown in FIG. 30(d)–(f), switch SW2 is closed at a time t20 to deliver a closing input signal to control circuit 15. Thus control circuit 15 outputs a closing signal, so that a current flows through relay coil X1 to energize same and to close electromagnetic valve 121. This closing signal meets the logical product requirements of AND gate 125, and a set input is applied to flip-flop 129 to invert same, thereby to cause light emitting diode 130 to report a damage to tube 7. The energization of relay coil X1 causes a current to flow through motor 19 in the direction of the arrow C to close window glass 2. However, since in this case the tube 7 is damaged, the pressure within the tube does not rise even if the frame may be contacted, and comparator 14 does not provide a contact detection signal.

While in this embodiment a momentary switch type push button switch is used as the push button switch, an alternate type switch may be used which is fixed at its lower end when the push button is pressed. Also, in this case, an air gap may be provided in the switch, the air gap communicating with tube 7, so that the diaphragm is pressed by the push button to apply a pressure to the tube. This allows the tube to be fixed in pressurized state when the push button is pressed, so that a similar advantage may be obtained although electromagnetic valve 121 may be omitted which operates in the interlock with relay coil X1.

We claim:

1. A contact sensitive control apparatus, for detecting a foreign object in an opening provided between a frame and a movable member for closing said opening, said apparatus comprising:
    a tube member adapted to be stretched on one of said frame and said movable member;
    pressure detection means for detecting application of pressure to said tube member by said foreign object and for outputting a detection signal indicating said application of pressure has occurred;
    control means for stopping movement of said movable member in response to said detection signal from said pressure detection means.

2. A contact sensitive control apparatus of claim 1, further including an electromagnetic valve communicating with said tube member for closing said tube member in response to an increase in pressure in said tube member.

3. A contact sensitive control apparatus of claim 1, wherein said tube member has a cross-sectional structure such that air can flow through the cross section of said tube member when said tube member is pressed.

4. A contact sensitive control apparatus of claim 3, wherein said tube member has protrusions and recesses along its inner surface.

5. A contact sensitive control apparatus of claim 3, wherein said tube member includes a soft line-like member inserted through the entire length thereof.

6. A contact sensitive control apparatus of claim 3, wherein the inner wall of said tube member has an uneven elastic characteristic.

7. A contact sensitive control apparatus of claim 1, wherein said tube member includes a line-like member inserted through its inner wall.

8. A contact sensitive control apparatus of claim 7, wherein said line-like member in said tube member includes a thin metal plate.

9. A contact sensitive control apparatus of claim 7, wherein said line-like member in said tube member includes a piece of metal wire.

10. A contact sensitive control apparatus of claim 1, wherein said tube member has an airtight structure and has a valve communicating with said tube member allowing external air to flow in said tube member when the pressure in said tube member is negative or less than atmospheric pressure.

11. A contact sensitive control apparatus of claim 1, wherein said tube is removably attached to one of said frame and said movable member.

12. A contact sensitive control apparatus as in claim 1, further comprising damage detection means for detecting damage to said tube member.

13. A contact sensitive control apparatus of claim 12 wherein said damage detection means includes:
    monitor input means including a first switching means for outputting a monitoring signal and a first one-shot multivibrator for generating a driving signal in response to said monitoring signal;
    an electromagnetic pump communicating with said tube member and applying a pressure to said tube member in response to said driving signal from said one shot multivibrator; and
    indicating means for providing an indication of whether or not said tube member is damaged, said indicating means comprising means for starting said indication in response to said monitoring signal and for stopping said indication in response to an increase in pressure in said tube member.

14. A contact sensitive control apparatus of claim 13, wherein said electromagnetic pump includes:
    an air chamber communicating said tube member and including a diaphragm on one surface;
    a plunger for pressing said diaphragm; and
    a solenoid for moving said plunger to press said diaphragm in response to said driving signal applied by said one-shot multivibrator.

15. A contact sensitive control apparatus of claim 14, wherein said monitor input means further includes a rise detector for detecting a rise signal from said multivibrator to deliver a display signal to said indicating means and to drive said electromagnetic pump, and a fall detector for applying a closing signal to said control means in response to a fall of the output signal from said multivibrator.

16. A contact sensitive control apparatus of claim 1, wherein said tube member has an air-tight structure, said apparatus further comprising:
    closing means for providing a closing signal to said movable member for causing said movable member to move to close said opening;
    a valve communicating with said tube member for allowing external air to rapidly flow in said tube member when the pressure within said tube is negative or less than atmospheric pressure;
    a solenoid connected to said tube member and driven responsive to said closing signal from said closing means to press said tube member to apply a constant pressure thereto and to close said tube member; and
    damage detection means for detecting damage to said tube when said pressure detection means does not provide a said detection signal within a predetermined time immediately after said closing signal is output from said closing means.

17. A contact sensitive control apparatus of claim 16, wherein said indicating means includes a flip-flop which is set in response to said monitoring signal from said monitor input means and outputs an operating signal, a transistor for outputting a driving signal in response to said operating signal from said flip-flop, and a light emitting diode which is turned on in response to said driving signal from said transistor.

18. A contact sensitive control apparatus of claim 1, further comprising a push button switch which includes an air chamber in communication with said tube member and a diaphragm formed at one surface of said air chamber, said push button switch comprising means for pressing said diaphragm simultaneously with pressing of said push button switch, and
    damage detection means for detecting damage to said tube member when no detection signal is outputted by said pressure detection means when said push button switch is pressed.

19. A contact sensitive control apparatus of claim 18, further comprising a closing means for providing a closing signal to said movable member for causing said movable member to move to close said opening, and wherein said damage detection means includes a flip-flop set responsive to said detection signal from said pressure detection means, and display means for displaying a damage indication to said tube member responsive to coincidence of a closing signal and said flip-flop being set.

* * * * *